Sept. 21, 1954     D. H. IMHOFF ET AL     2,689,821

HYDROCARBON CONVERSION PROCESS

Filed Oct. 17, 1950     3 Sheets-Sheet 1

INVENTORS.
DONALD H. IMHOFF,
RAOUL P. VAELL,
CLYDE H.O. BERG,
BY Ross J. Garofalo
ATTORNEY.

Sept. 21, 1954     D. H. IMHOFF ET AL     2,689,821

HYDROCARBON CONVERSION PROCESS

Filed Oct. 17, 1950     3 Sheets-Sheet 2

INVENTORS.
DONALD H. IMHOFF,
RAOUL P. VAELL,
CLYDE H. O. BERG,
BY Ross J. Garofalo
ATTORNEY.

Sept. 21, 1954 D. H. IMHOFF ET AL 2,689,821
HYDROCARBON CONVERSION PROCESS
Filed Oct. 17, 1950 3 Sheets-Sheet 3

INVENTORS.
DONALD H. IMHOFF,
RAOUL P. VAELL,
CLYDE H. O. BERG,
BY Ross J. Garofalo
ATTORNEY.

Patented Sept. 21, 1954

2,689,821

UNITED STATES PATENT OFFICE 2,689,821

HYDROCARBON CONVERSION PROCESS

Donald H. Imhoff, Long Beach, Raoul P. Vaell, Beverly Hills, and Clyde H. O. Berg, Long Beach, Calif., assignors to Union Oil Company of California, Los Angeles, Calif., a corporation of California Application October 17, 1950, Serial No. 190,496

13 Claims. (Cl. 196—49)

This invention relates generally to the conversion of hydrocarbons in a catalytic contacting process for upgrading such hydrocarbons. More specifically, this invention relates to an improved catalytic hydrogenation process wherein a mixture of feed stocks is employed, the one being dehydrogenated and the other undergoing hydrogenation.

Catalytic upgrading of petroleum hydrocarbon stocks is well known in the art and such processes are employed to effect one or several of such reactions as hydrogenation, dehydrogenation, aromatization, isomerization, desulfurization, and the like. One such catalytic process is termed "hydroforming" and employs any of several catalysts, such as molybdena on alumina catalysts, for effecting aromatization of the stock in order to improve the octane rating. In this process hydrogen is produced by the dehydrogenation of the naphthenes and such hydrogen is recycled with the incoming feed to effect the reaction in a hydrogen-rich atmosphere and minimize coke deposition thereby.

In general the commercial installations of the hydroforming process have employed static catalyst beds to reform straight run stocks. Because of the endothermic nature of the naphthene dehydrogenation reaction a large temperature drop is observed across the reactor bed. The net result is that the feed stock must be heated considerably above the optimum hydroforming temperature and the product is withdrawn at a temperature which is considerably below the optimum hydroforming temperature.

One possible means for effecting hydroforming at substantially a constant optimum temperature would be to employ a fluid type catalyst. Such processes, however, are relatively inefficient for effecting certain reactions, e. g., hydroforming, because of the channeling which necessarily occurs in a fluidized reactor bed.

Another disadvantage of the prior art lies in the fact that no provision is made for the maximum utilization of the straight run feed which may be employed along with the cracked stock. Thus excessive quantities of straight run have been required in the past.

This invention relates to a new method for effecting the catalytic conversion of hydrocarbon stocks at substantially isothermal conditions in a moving bed by a suitable control of the concentrations of the reactants at the various levels within the moving bed and also by controlling the ratio of the two feed stocks, the one cracked and the other non-cracked, in order to provide a hydrogen balance.

It is an object of this invention to control the ratio of cracked and straight run feed stocks to a catalytic process so that a substantial balance of the hydrogen requirement is attained.

It is an object of this invention to reform catalytically two hydrocarbon stocks in a moving catalyst bed wherein the concentrations of the reactants are controlled so that a desired temperature profile in the reactor system is produced.

It is another object of this invention to process simultaneously cracked and straight run fractions in a moving bed of catalyst wherein the ratio of the cracked stock to the straight run is controlled by a suitable process variable.

It is another object of this invention to process a relatively cracked and a relatively non-cracked fraction in the presence of a moving bed of a cobalt molybdate catalyst whereby a substantially saturated product of high octane number is obtained without recourse to outside hydrogen facilities or production.

It is another object of this invention to provide a catalytic process wherein catalyst is conveyed from a first level to a second level by means of a gas lift employing a hydrogen-rich stream, whereby the exhaust lift gas is reduced in hydrogen content by the reduction of the catalyst and such exhausted lift gas is discharged from the system to prevent the build-up of inert gas, such as methane, in the system.

It is another object of this invention to control the reactor pressure in a moving bed catalytic reactor by appropriately varying the ratio of cracked to straight run feed stocks whereby hydrogen is produced or consumed to maintain a given desired pressure.

Briefly, the present invention comprises an improved catalytic reforming process which is divided into two major operations, the first including a reaction step or series of reaction steps wherein hydrogen-containing gases are circulated through a reaction zone and the second including a regeneration step wherein oxygen-containing gases are circulated over the catalyst to remove carbon deposits in a regeneration zone. In the preferred form of the invention a catalyst is passed from one of such operations by means of gravity flow to the other of such operations and the catalyst discharged from the latter is conveyed to the former by means of a gas lift. Suitable sealing means are provided to prevent passage of oxygen-containing gases into hydrogen-containing gases.

The present invention eliminates the serious disadvantage of conventional hydroforming or other reforming operations by employing a mixed feed stock, the one being a cracked stock which is relatively rich in olefinic components and the other being a straight run stock which is relatively rich in naphthenes. Under the process conditions the olefins are at least partially hydrogenated to produce saturated hydrocarbons therefrom exothermically. Simultaneously the naphthenes are dehydrogenated or aromatized endothermically to produce aromatics. In the operation of the invention either the ratio of the feed stocks or the hydrogen concentration is so controlled that any desired or optimum temperature profile may be maintained throughout the length of the catalyst bed by suitably controlling and varying the rate of the dehydrogenation relative to the rate of hydrogenation.

In one method for effecting temperature control the straight run naphthene-rich stock is introduced at one end of the moving catalyst bed along with all or a substantial part of the recycle hydrogen stream. The cracked feed stock is divided into two or more portions and is injected at several levels throughout the catalyst bed in such amounts that the desired temperature profile will result, e. g., isothermal operation.

In another modification of the invention the cracked stock and straight run feed stocks are mixed and introduced into the moving catalyst bed. Recycle hydrogen is injected at several levels along the path of vapor flow through the catalyst bed in order to control the relative rate of hydrogenation and dehydrogenation and thus maintain a desired temperature profile.

Another feature of this invention resides in the methods for supplying the two feed stocks to the reaction zone or zones wherein the flow of the one stock, e. g., the cracked stock, is controlled by a suitable process variable, such as the hydrogen content of the recycle gas, the hydrogen concentration of the recycle gas, the pressure of the reaction zone, or the like and the other stock, e. g., the straight run stock, is controlled to maintain a constant total flow of feed stock to the reaction zone or zones or alternatively is controlled to maintain a constant liquid product production rate from the reaction zone or zones.

In the application of this invention two feed stocks are passed into the moving catalyst bed. The first feed stock is generally either of the straight run or of the natural gasoline condensate type or any other relatively naphthene-rich stocks. The naphthene-rich feed stock should normally contain greater than about 30% by volume of naphthenes and normally should contain less than about 5% by volume of olefinic hydrocarbons. The second feed stock is an olefin-rich stock such as is obtained by catalytic or thermal cracking by pyrolysis, coking, polymerization and the like. Such feed stock will in general contain up to about 3% by weight of sulfur and up to about 0.3% by weight of combined organic nitrogen. The olefin-rich feed stock should preferably contain between about 15 and 70% by volume of olefinic hydrocarbons.

The boiling range of the two stocks will normally lie in the gasoline boiling range or slightly higher, such as below about 450° F. In certain instances higher boiling range stocks such as up to about 700° F. or more may be employed if desired.

Catalytic agents which accelerate the dehydrogenation, cyclization, and other reactions occurring in the hydrocarbon reforming operation include oxides of vanadium, chromium, molybdenum, and tungsten used alone or oxides of copper and chromium, chromium and molybdenum, and the like used together. The quantity of the catalytic agent in the finished catalyst normally is in the range from about 5% to 25% by weight and preferably in the range between about 7% and 12%. The carrier may be any one of the known refractory oxides including silica, titania, alumina, thoria, zirconia, or mixtures thereof. Of particular merit is a carrier of alumina containing about 5% silica.

The preferred method for preparing the catalysts used in the present invention includes the steps of drying the carrier at 100° C., a calcination for about two hours at 600° C., impregnation of the carrier with a sodium-free aqueous solution containing a soluble compound of the active metal or metals, evaporation of the residual water from the drained carrier at 100° C., and a final calcination of 2 to 6 hours' duration at 600° C. When a mixture of elements is employed, as in a copper chromate or cobalt molybdate catalyst, two or more successive impregnation steps are employed each followed by a drying and a calcination step.

Applied to catalytic reforming, these catalysts effect isomerization, hydrogenation, hydrocracking, desulfurization and aromatization reactions at temperatures between about 800° F. and 950° F. When sulfur-bearing stocks are treated, molybdenum oxide forms metal sulfides on the catalyst which are converted to sulfur dioxide on regeneration. The other catalysts named reduce the sulfur of the feed to hydrogen sulfide which is produced with the hydrocarbon product. The process of this invention utilizes each of these catalysts with little modification, with the one exception that when molybdenum oxide is the active agent, a hydrogen reduction step is required following the spent catalyst regeneration to bring the catalyst to its highest degree of activity.

While any of the foregoing catalysts may be employed in the process of this invention, it has been found that catalysts of the cobalt molybdate type are extremely effective for carrying out the process and are therefore the preferred catalysts. Cobalt molybdate type catalysts are extremely resistant to sulfur and nitrogen poisoning and at the same time possess the necessary physical ruggedness to permit their use in a moving bed type operation. Furthermore, the hydrogenation rate in the presence of a cobalt molybdate catalyst is extremely rapid with the result that extremely fine temperature control can be attained by olefin or hydrogen injection according to the methods of this invention, such as is not so readily obtainable with the aforementioned catalysts.

Cobalt molybdate catalysts in general comprise mixtures of cobalt and molybdenum oxides wherein the molecular ratio of $CoO$ to $MoO_3$ is between about 0.4 and 5.0. This catalyst may be employed in unsupported form or alternatively it may be distended on a suitable carrier such as alumina, silica, zirconia, thoria, magnesia, magnesium hydroxide, titania or any combination thereof. Of the foregoing carriers it has been found that the preferred carrier material is alumina and especially alumina containing about 3–8% by weight of silica.

In the preparation of the unsupported cobalt molybdate catalyst the catalyst can be co-precipitated by mixing aqueous solutions of, for example, cobalt nitrate and ammonium molybdate, whereby a precipitate is formed. The precipitate is filtered, washed, dried and finally activated by heating to about 500° C. Alternatively, the cobalt molybdate may be supported on alumina by co-precipitating a mixture of cobalt, aluminum and molybdenum oxides. A suitable hydrogel of the three components can be prepared by adding an ammoniacal ammonium molybdate solution to an aqueous solution of cobalt and aluminum nitrates. The precipitate which results is washed, dried and activated. In still another method a washed aluminum hydrogel is suspended in an aqueous solution of cobalt nitrate and an ammoniacal solution of ammonium molybdate is added thereto. By this means a cobalt molybdate gel is precipitated on the alumina gel carrier. Catalyst preparations similar in nature to these and which can also be employed in this invention have been described in U. S. Patents 2,369,432 and 2,325,033.

Still other methods of catalyst preparation may be employed such as by impregnating a dried carrier material, e. g. an alumina-silica gel, with an ammoniacal solution of cobalt nitrate and ammonium molybdate. Preparations of this type of cobalt molybdate catalyst are described in U. S. Patent 2,486,361. In yet another method for preparing impregnated molybdate catalyst the carrier material may be first impregnated with an aqueous solution of cobalt nitrate and thereafter impregnated with an ammoniacal molybdate. Alternatively the carrier may also be impregnated with both solutions in reverse order. Following the impregnation of the carrier by any of the foregoing methods the material is drained, dried and finally activated in substantially the same manner as is employed for the other catalysts. In the preparation of impregnated catalysts where separate solutions of cobalt and molybdenum are employed, it has been found that it is preferable to impregnate the carrier first with molybdenum, e. g., ammoniacal ammonium molybdate, and thereafter to impregnate with cobalt, e. g., aqueous cobalt nitrate, rather than in reverse order.

In yet another method for the preparation of suitable catalyst a gel of cobalt molybdate can be prepared as described hereinbefore for the unsupported catalyst, which gel after drying and grinding can be mixed with a ground alumina, alumina-silica or other suitable carrier together with a suitable pilling lubricant or binder which mixture can then be pilled or otherwise formed into pills or larger particles and activated.

In yet another modification finely divided or ground molybdic oxide can be mixed with suitably ground carrier such as alumina, alumina-silica and the like in the presence of a suitable lubricant or binder and thereafter pilled or otherwise formed into larger agglomerated particles. These pills or particles are then subjected to a preliminary activation by heating to 600° C., for example, and are thereafter impregnated with an aqueous solution of cobalt nitrate to deposit the cobalt thereon. After draining and drying the particles are heated to about 600° C. to form the catalyst.

It is apparent from the foregoing description of the different types of cobalt molybdate catalyst which may be employed in this invention that we may employ either an unsupported catalyst, in which case the active agents approximate 100% of the composition or we may employ a supported catalyst wherein the active agents, cobalt and molybdenum oxides, will generally comprise from about 7 to 22% by weight of the catalyst composition. In all of the foregoing catalytic preparations it is desirable to maintain the molecular ratio of cobalt oxide as $CoO$ to molybdic oxide as $MoO_3$ between about 0.4 and 5.0.

The reforming reactions of this invention may be carried out at temperatures between about 800 and 950° F. and preferably in the range of 850 to 900° F. It has been found that when the process is carried out in this temperature range the hydrogenation and aromatization reactions are both rapid such that control of the temperature profile becomes possible. Furthermore, carbon deposition on the catalyst is not excessive and destructive hydrogenation of naphthenes and other feed stock components such as destroys hydrogen-producing naphthenes and needlessly consumes hydrogen is minimized.

The process may be carried out at pressures between about atmospheric and 1000 p. s. i. and preferably in the range of about 200 to 600 p. s. i. Such pressures promote the hydrogenation of olefins and the simultaneous dehydrogenation of naphthenes to aromatics.

The hydrogen produced in the process is continuously recirculated with the incoming feed and at intermediate levels in the moving catalyst bed if desired. In general the hydrogen recycle rate should be maintained between about 100 and 10,000 cubic feet of hydrogen per barrel of feed and preferably in the range of about 500 to 1500 cubic feet per barrel of feed. The hydrogen concentration of the recycle gas will normally vary between 25 and 70% by volume and is generally in the range of about 50% by volume.

The liquid hourly space velocity which relates the volume of liquid feed to the volume of the catalyst bed which is contacted per hour may be in the range of 0.1 to 10 and preferably in the range of 0.2 to 1.5. Where the feed stock is injected at intermediate levels in the reaction zone the liquid hourly space velocity for the purposes of this invention is calculated as though the entire amount of liquid feed were passed throughout the entire catalyst bed.

In a moving bed type catalytic process the reaction zone is continuously filled from the top with fresh catalyst and spent catalyst is continuously withdrawn from the bottom. The average time required to replace the entire reactor volume with fresh catalyst is defined as the catalyst contact time. The catalyst contact time may alternatively be defined as the time during which a given catalyst particle on the average is contacted with reactants between regenerations. In general it has been found that the catalyst contact time should be between about 0.5 and 100 or more hours and preferably in the range of about 5 to 30 hours.

The process and apparatus of the present invention will be more clearly understood by reference to the accompanying drawings in which.

Figures 1, 4:
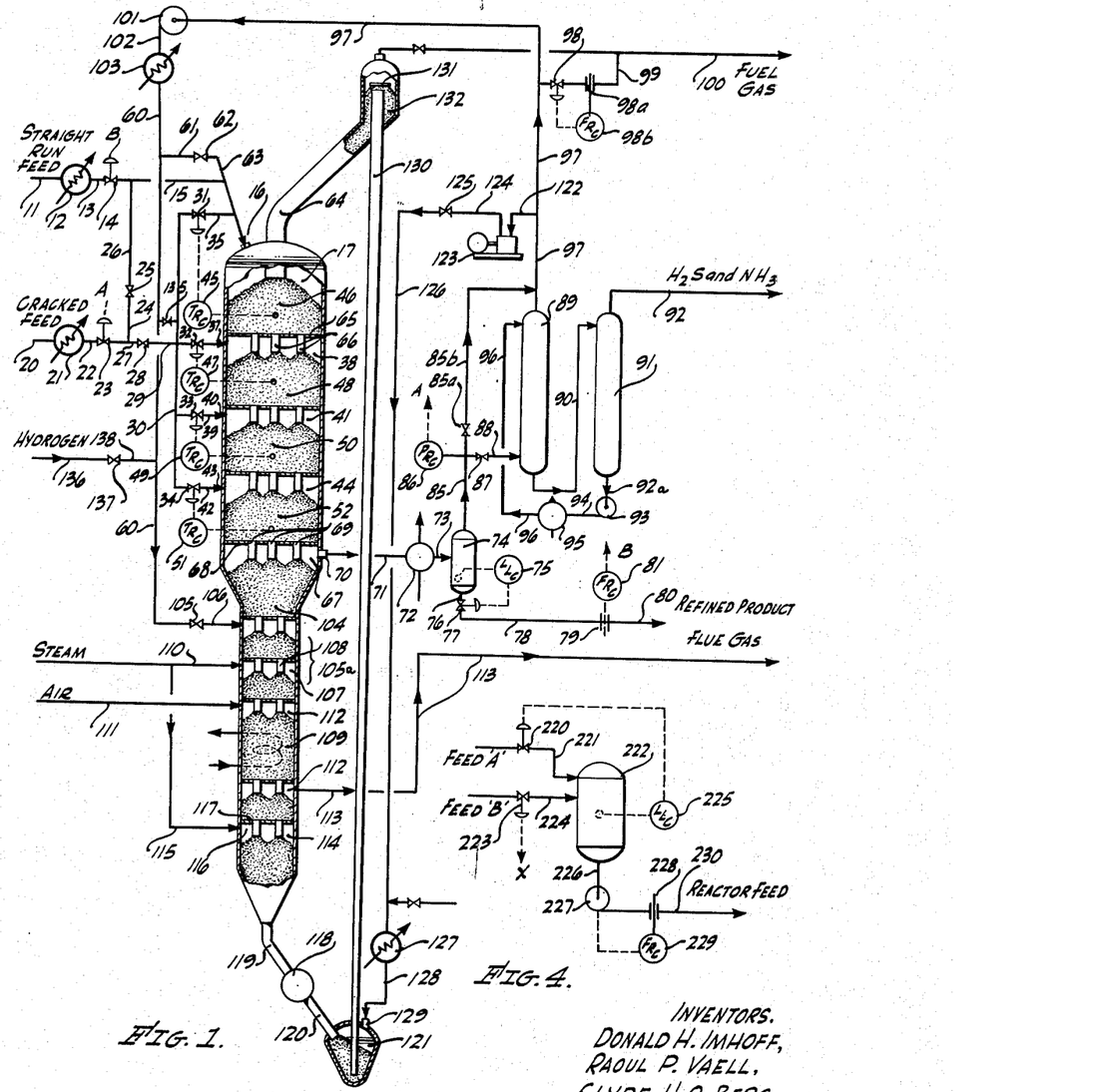
Figure 1 is a schematic flow diagram of a moving bed catalytic process wherein two feed stocks are employed to obtain a desired temperature profile within the reaction zone and wherein the reaction zone is positioned over the regeneration zone.
Figure 4 shows an alternate method for controlling the flow rate of one of two feed stocks by a process variable and controlling the flow rate of a second feed stock to provide a constant total reactor feed flow.

Referring now more particularly to Figure 1, straight run feed stock is introduced into line 11 and heated by heater 12 whence it flows through line 13 to motor valve 14. Motor valve 14 is controlled according to methods to be described hereinafter. Flow from motor valve 14 passes through line 15 to reactor feed inlet 16 and thence into primary feed engaging zone 17.

Cracked feed stock is introduced through line 20 to heater 21 and flows through line 22 to motor valve 23. Motor valve 23 is controlled by a suitable process variable described more fully hereinafter such as by the reactor pressure, the hydrogen content of the hydrogen recycle stream or other such variable. If desired, effluent cracked feed stock from motor valve 23 may be passed into line 24 through opened valve 25 and line 26 whence it joins the straight run feed stock in line 15 flowing to reactor feed inlet 16. Alternatively valve 25 is blocked and effluent cracked feed stock from motor valve 23 flows through line 27, opened valve 28 and line 29 to header line 30.

Header line 30 is connected to a series of four motor valves 31, 32, 33 and 34, respectively. Effluent from motor valve 31 flows through line 35 to reactor feed inlet 16 wherein it is mixed with the straight run feed flowing through line 15. Effluent from motor valve 32 flows through line 36 to feed inlet 37 which in turn connects with secondary feed engaging zone 38. Motor valve 33 effluent flows through line 39 to feed inlet 40 which connects with tertiary feed engaging zone 41. Motor valve 34 effluent flows through line 42 to feed inlet 43 which connects with quaternary feed engaging zone 44.

Flow through motor valve 31 is controlled by temperature recorder controller 45 which is actuated by a thermocouple located in primary reaction zone 46. Flow through motor valve 32 is controlled by temperature recorder controller 47 which is actuated by a thermocouple located in secondary reaction zone 48. Flow through motor valve 33 is controlled by temperature recorder controller 49 which is in turn actuated by a thermocouple located in tertiary reaction zone 50. Flow through motor valve 34 is controlled by temperature recorder controller 51 which is in turn actuated by a thermocouple located in quaternary reaction zone 52.

Hot recycle hydrogen flowing in line 60 enters line 61, open valve 62 and line 63 whence it flows to reactor inlet 16 and thence into primary feed engaging zone 17.

The mixture of straight run feed, cracked feed and recycle hydrogen in primary feed engaging zone 17 pass into contact with freshly regenerated and reduced catalyst in primary reaction zone 46 which is supplied through catalyst transfer line 64. In the presence of the catalyst a part of the naphthenes are endothermically aromatized and a part of the olefins are exothermically hydrogenated. The relative rates of these two principal reactions accordingly raise or lower the temperature of the catalyst and vapors flowing through primary reaction zone 46. The thermocouple in primary reaction zone 46 transmits temperature fluctuations of the primary reaction zone to temperature recorder controller 45 which in turn opens motor valve 31 in order to increase the temperature or closes motor valve 31 in order to lower the temperature as required.

Catalyst and vapors from primary reaction zone 46 flow to secondary reaction zone 48 through secondary feed engaging zone 38. Secondary feed engaging zone 38 comprises a transverse plate 65 which is fitted with a series of downcomers 66 which transfer catalyst from the primary reaction zone 46 above plate 65 to secondary reaction zone 48 thereby providing a free vapor space for introducing vapors into uniform contact with the catalyst in the secondary feed engaging zone 38.

Catalyst and vapors issuing from downcomers 66 are enriched with additional cracked feed stock introduced into secondary feed engaging zone 38. In secondary reaction zone 48 the freshly added olefins are at least partially hydrogenated to furnish heat while naphthenes are simultaneously dehydrogenated with the consumption of heat. The thermocouple in secondary reaction zone 48 transmits temperature fluctuations to temperature recorder controller 47 which in turn opens or closes motor valve 32 to permit temperature control.

In corresponding manner catalyst and vapors from secondary reaction zone 48 are discharged to tertiary reaction zone 50 through tertiary feed engaging zone 41 wherein they are enriched with additional cracked stock through motor valve 33 controlled by temperature recorder controller 49 to maintain temperature control in tertiary reaction zone 50.

Likewise catalyst and vapors from tertiary reaction zone 50 pass through quaternary feed engaging zone 44 to quaternary reaction zone 52 wherein they are enriched with additional cracked stock through motor valve 34 controlled by temperature recorder controller 51 to maintain temperature control within the quaternary reaction zone 52.

Products from quaternary reaction zone 52 and catalyst flow through product disengaging zone 67 which, like the previously described feed engaging zones, consists of a transverse plate 68 and a series of downcomers 69 which discharge catalyst through plate 68 to a short distance therebelow. Gases separating from the flowing catalyst are removed in the gaseous space thereabove through outlet 70 and line 71.

Product vapors in line 71 flow through cooler 72 wherein the vapors are condensed and these flow through line 73 to gas-liquid separating vessel 74 fitted with liquid level control 75. Accumulated liquid in vessel 74 is removed through lower line 76 which is in turn controlled by motor valve 77. Motor valve 77 is actuated by liquid level control 75 to maintain a given liquid level in vessel 74. Effluent from motor valve 77 flows through line 78 and orifice plate 79 to line 80 whence it flows to refined product production. Orifice plate 79 actuates flow recorder controller 81 which is the control instrument for motor valve 14 on the straight run feed line. Motor valve 14 is thus controlled to increase or decrease the flow of straight run feed to the primary reaction zone 46 in order to supply a given product flow rate to line 80.

Gaseous reaction products are withdrawn from gas-liquid separating vessel 74 through line 85. Pressure on line 85 actuates pressure recorder controller 86 which in turn controls motor valve 23 on the cracked feed stock inlet line. As the supply of cracked feed stock increases beyond a desired value, additional hydrogen is consumed and the system pressure, as determined by pressure recorder controller 86, falls correspondingly. The drop in pressure in turn partially closes motor valve 23 to cut back on the cracked feed stock and decrease hydrogen consumption and thus permit the pressure to rise to a pre-set value. Similarly, whenever the cracked feed stock is insufficient the system pressure will rise above the preset value and motor valve 23 will be correspondingly opened.

The opening and closing of motor valve 23 ultimately increases or decreases the flow of refined production through orifice plate 79. Flow recorder control 81 operating on orifice plate 79 in turn opens or closes motor valve 14 on the straight run feed inlet in order to maintain a constant flow of product. The net result of such instrumentation is to provide approximately a constant total flow of the straight run feed plus the cracked feed flowing to the several reaction zones.

The gaseous product withdrawn from separating vessel 74 through line 85 may be processed if desired to separate hydrogen sulfide and ammonia. If such operation is desired valve 87 is opened to permit the flow of gas through line 88 to absorber 89 wherein the gas countercurrently contacts a suitable absorbent for such gases such as mono-ethanolamine, di-ethanolamine or the like. The rich absorbent from absorber 89 is withdrawn through line 90 and passed through stripper 91 wherein the solution is heated so as to flash absorbed gases overhead through line 92. Lean absorbent solution is withdrawn from stripper 91 through line 92a whence it flows to pump 93 and is forced through line 94, cooler 95 and line 96 to the top of absorber 89.

Non-absorbed gases containing hydrogen are withdrawn from absorber 89 through line 97. Where ammonia and/or hydrogen sulfide removal is not required, or is not desirable, valve 85a is opened and the gases from gas-liquid separating vessel 74 are passed through line 85b to line 97, thereby by-passing the absorber. A part of the gas stream in line 97 may be discharged continuously through valve 98, orifice plate 98a and line 99 into fuel gas line 100. A constant bleed of hydrogen-containing gases from the system prevents the accumulation of inerts in the stream such as methane, ethane and the like. Valve 98 may, if desired, be a motor valve which is in turn controlled by a flow recorder controller 98b in line 99 which is in turn responsive to variation of flow through orifice plate 98a. Alternatively, a part of the gas stream in line 97 may be processed to recover the hydrogen content which is then returned to line 97 downstreamwardly and the inerts may be discharged to fuel gas. The major portion of the hydrogen-containing gas in line 97 passes to blower 101 wherein its pressure is increased sufficiently to overcome its resistance to flow through the multiple reaction zones, etc.

Pressured gas from blower 101 passes through line 102, heater 103 into line 60 previously described as the recycle hydrogen stream.

Spent catalyst from product disengaging zone 67 passes downwardly through stripping zone 104 wherein it flows counter-currently to upwardly flowing hydrogen introduced from line 60 through valve 105 and line 106. The hydrogen flows upwardly through stripping zone 104 and is withdrawn along with the products through line 71. Stripped catalyst flows downwardly from stripping zone 104 through sealing zone 105a. Steam in line 110 is introduced into steam engaging zone 107 wherein a part flows upwardly through downcomers 108 and sweeps the downflowing catalyst free of hydrogen. The upwardly moving steam passes through stripping zone 104 and is removed along with hydrogen and other products. A portion of the steam entering line 110 passes downwardly with the catalyst and flows into regeneration zone 109. Compressed air or air diluted with inert gas such as flue gas or nitrogen is injected through line 111 into air engaging zone 112 whence it flows downwardly with the catalyst through regeneration zone 109. The burning of the carbonaceous deposits from the catalyst in regeneration zone 109 is controlled to a temperature below that which causes thermal decomposition of the catalyst. Such regenerations may be controlled to temperatures below 1100° F., for example. This may be done either by diluting the air with inert gas or by indirectly cooling the hot catalyst with a cooling agent circulated through pipes or otherwise such as is shown diagrammatically in regeneration zone 109. Regenerated catalyst and flue gases flow into regeneration gas disengaging zone 112 whence they are removed through line 113.

Regenerated catalyst thereafter flows through sealing zone 114. Steam introduced through line 115 flows into steam engaging zone 116 wherein it divides and a part flows upwardly through downcomers 117 and is removed from the regeneration gas disengaging zone through line 113. The remaining steam flow passes downwardly with the catalyst and prevents an upflow of hydrogen into the regeneration zone 109.

Catalyst from sealing zone 114 flows to pressuring zone 118 through line 119. Pressuring zone 118 is any suitable form of apparatus for removing catalyst from line 119 increasing its pressure and transferring the pressured catalyst to line 120. Pressuring zone 118 may be a "star feeder" such as is employed to transfer solids from one pressure to a different pressure. In another modification pressuring zone 118 may consist of a series of vessels each of which may alternately be employed to receive a solid at a first pressure, such as by means of gravity flow, after which the vessel is isolated, pressured, and connected with the high pressure line to permit removal of the solids, such as by gravity, into the higher pressure zone.

Catalyst flows from pressuring zone 118 through transferring zone created by line 120 into the induction zone bounded by closed vessel 121.

Recycle hydrogen in line 97 is withdrawn through line 122 into compressor 123 whence it is compressed to somewhat above the lift line pressure and passed through line 124, valve 125 and line 126, heater 127, line 128 into inlet 129 of closed vessel 121.

The compressed hydrogen in vessel 121 exerts a downward pressure on the catalyst surface partially filling the vessel and causes such catalyst to enter the lower open submerged end of lift line 130 whence the catalyst is forced upwardly through the bore of lift line 130. The flow of catalyst in lift line 130 is preferably of the compact type known as mass flow.

Following the oxidation in the regeneration zone 109 the catalyst must normally be reduced prior to re-using it in a reaction zone. In this modification of the invention the oxidized catalyst is lifted with hydrogen and the catalyst is reduced during the lifting.

The solid bed of catalyst in lift line 130 presses upwardly against pressure plate 131 and spills downwardly therefrom in a compact separation zone 132. Reduced catalyst from separation zone 132 flows through transfer line 64 and discharges into primary reaction zone 46 wherein it contacts straight run feed stock and hydrogen as described hereinbefore.

As has been previously described, the entire flow of cracked feed stock may be introduced through line 15 along with the straight run feed stock by opening valve 25 and closing valve 28. Under such conditions the temperature control within the reactor may be obtained by varying the hydrogen content of the gaseous phase throughout the several reaction zones. The variations in the concentration of the hydrogen may be produced by completely closing valve 62 and opening valve 135 whereupon recycle hydrogen is transferred from line 60 to header line 30 which is in turn attached to motor valves 31, 32, 33 and 34, for the introduction of hydrogen in the primary, secondary, tertiary and quaternary reaction zones 46, 48, 50 and 52 respectively. The flow through each motor valve under this type of operation is controlled to maintain a desired temperature profile analogous to that which has been described hereinbefore in connection with the cracked feed injection. As the temperature in a given reaction zone increases, the hydrogen injection in the engaging zone corresponding thereto is decreased to maintain a pre-set temperature. As the temperature decreases in a given reaction zone the hydrogen injection in the corresponding engaging zone is increased.

Under normal operation the ratio of cracked and straight run feed stock is so regulated that a hydrogen balance is maintained within the reactor system, and this is the preferred method of operation. However, in certain cases hydrogen produced externally or arising from miscellaneous refinery operations such as cracking may be introduced into the system through line 136, valve 137 and line 138 whence it flows into hydrogen recycle line 60. Such hydrogen may be heated as required by means not shown.

In still another modification of the invention a mixture of cracked stock and hydrogen may be passed to header line 30 by the opening of valves 28 and 135 and the flow of the mixture to each of the four reaction zones may be controlled by motor valves analogous to that previously described for either of the single components.

Figures 2, 3, 7:
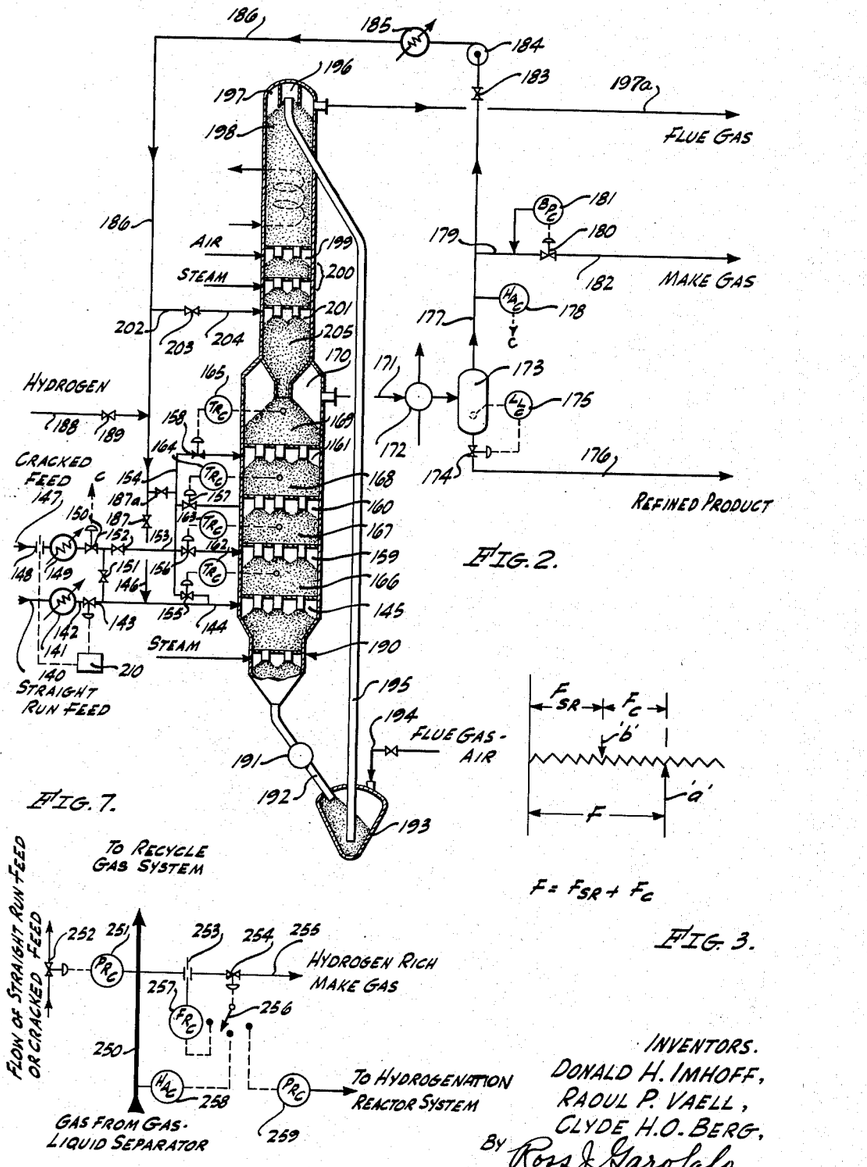
Figure 2 shows a modification of the apparatus of Figure 1 wherein the regeneration zone is positioned above the reaction zone.
Figure 3 shows an electrical resistance circuit for controlling the flow rate of one feed stock in relation to the continuously varying flow rate of a second feed stock such that the sum of the two flow rates remains constant.
Figure 7 shows three methods for controlling the hydrogen recycle stream while simultaneously controlling the blend of the two feed stocks flowing to the reactor.

Referring now more particularly to Figure 2, the reducing and regenerating sections of the apparatus may be placed over the several reaction zones and coked rather than regenerated catalyst may be transferred to the lift line. Also the catalyst flow may be countercurrent to the flow of vapors.

In Figure 2 straight run feed stock is introduced through line 140 whence it flows through heater 141, line 142 and motor valve 143. Effluent from motor valve 143 flows through line 144 to primary feed engaging zone 145. Hydrogen flowing in line 146 joins line 144 and passes into the primary feed engaging zone 145.

Cracked feed stock is introduced through line 147 and flows through orifice plate 148, heater 149 and motor valve 150. Effluent from motor valve 150 may be passed through valve 151 into line 144 wherein it joins the straight run feed stock. Alternatively effluent of motor valve 150 passes through valve 152 into line 153 whence it flows into header line 154. Analogous to the valving arrangement and temperature control described hereinbefore in connection with Figure 1, header line 154 discharges into a series of four motor valves 155, 156, 157 and 158, each of which in turn controls the flow of cracked feed stock in header line 154 to primary feed engaging zone 145, secondary feed engaging zone 159, tertiary feed engaging zone 160 and quaternary feed engaging zone 161, respectively. The flow in each of the four motor valves 155, 156, 157 and 158 is controlled by four corresponding temperature recorder controllers 162, 163, 164 and 165, respectively, which in turn are actuated by four corresponding thermocouples in the four reaction zones, viz., the primary reaction zone 166, the secondary reaction zone 167, the tertiary reaction zone 168 and the quaternary reaction zone 169. Hydrocarbon vapors and hydrogen, in primary feed engaging zone 145, contact countercurrently the descending catalyst and flow upwardly through downcomers against the downward flow of catalyst. Such vapors pass into contact with the primary reaction zone 166 wherein a partial reaction occurs. The vapors leaving primary reaction zone 166 mixes with additional cracked feed stock in secondary feed engaging zone 159 and pass upwardly through downcomers into secondary reaction zone 167. The partially reacted vapors from secondary reaction zone 167 are mixed with additional cracked feed stock and pass upwardly into the tertiary reaction zone 168 and after reaction are mixed with additional cracked feed stock and pass upwardly into the quaternary reaction zone 169. The reaction products separate in product disengaging zone 170 and are withdrawn through line 171 and pass through cooler 172 to gas-liquid separating vessel 173. Liquid withdrawal from the bottom of gas-liquid separating vessel 173 is controlled by motor valve 174 which is actuated by liquid level control 175. The final product is withdrawn through line 176. Hydrogen-containing gases are withdrawn from the top of gas-liquid separating vessel 173 through line 177 which is fitted with hydrogen analyzer controller 178. Line 177 is also attached to line 179 which passes to motor valve 180 operated by back pressure controller 181 operating to maintain a given pressure in line 179. Make gas is withdrawn as the effluent from motor valve 180 through line 182. The bulk of the hydrogen stream in line 177 passes through valve 183 to blower 184 whence it flows to heater 185 and is discharged into line 186. Hydrogen in line 186 flows through valve 187 into line 146 previously described.

The hydrogen content of the make gas discharged through line 182 may be recovered by any suitable separation process, such as fractional distillation, hypersorption, oil absorption or the like, and returned to the system such as through hydrogen feed line 188.

While the preferred method of operation is such that the hydrogen produced balances the hydrogen consumed in the process, outside hydrogen may be introduced through line 188 and valve 189 whence it flows into line 186.

Spent catalyst from primary feed engaging zone 145 flows downwardly through sealing zone 190, which is similar to sealing zones described hereinbefore in connection with Figure 1. A portion of the sealing steam flows upwardly and passes through the several reaction zones with the hydrocarbon feed stock. Another portion of the sealing steam flows downwardly through pressuring zone 191 which is similar to that described hereinbefore in connection with Figure 1. Spent catalyst, after it has been repressured in pressuring zone 191, flows through transfer line 192 into induction zone 193. Flue gas or flue gas-air mixtures are introduced under pressure through line 194 into the induction zone 193 and exerts a downward pressure on the bed of spent catalyst contained therein, causing it to flow into the submerged lower end conveyance line 195 and upwardly therethrough. The compact bed of catalyst flowing in conveyance line 195 flows upwardly and fills cylinder 196. Catalyst flows from the bottom of cylinder 196 in a compact bed into lift gas separation zone 197 wherein the lift gas separates and is removed through line 197a.

In one modification of the invention, all or part of the regeneration of the spent catalyst may be effected during conveyance of the spent catalyst in conveyance line 195. Under such conditions temperature control of the catalyst is effected by control of the carbon on the catalyst and by the concentration of the air added to the lifting gas.

Catalyst from separation zone 197 flows downwardly through regeneration zone 198 which contains indirect cooling means shown diagrammatically. In regeneration zone 198 the spent catalyst countercurrently contacts regeneration gas such as air or mixtures of air and inert gases which are introduced into regeneration gas engaging zone 199. Catalyst from the regeneration zone 198 flows through sealing zone 200 wherein a small amount of steam passes countercurrently through the regenerated catalyst and a second portion of the steam passes concurrently with the catalyst downwardly. The upward flowing steam is removed in the flue gas disengaging zone 197. Catalyst from sealing zone 200 flows concurrently with steam into reducing gas engaging zone 201.

Hydrogen from line 133 is permitted to flow from line 202 through valve 203 and line 204 into reducing gas engaging zone 201. Hydrogen gas flowing through catalyst reduction zone 205 reduces the catalyst and the spent reducing gas and catalyst flow downwardly and are discharged into the product disengaging zone 170. The catalyst continues to flow downwardly through the four reaction zones described hereinbefore and the spent reducing gas is removed with the products through line 171.

It is preferable that the total feed rate to the reaction zones, which in turn is the sum of the flow rates of the straight run and cracked feed stocks, be maintained constant.

Hydrogen analyzer controller 178 operates to control the motor valve 150 on the cracked feed inlet in order to maintain a fixed concentration of hydrogen in the recycle gas stream. As the hydrogen concentration increases or decreases the flow of cracked stock is increased or decreased correspondingly.

Referring now more particularly to Figure 3 in connection with Figure 2, Figure 3 presents an electrical system for maintaining a constant feed rate to the reactor. In Figure 3, F corresponds to the desired total flow rate and a pointer "a" is set on an electrical resistance at a point corresponding to the total flow desired. This is determined by letting 1 ohm of resistance be, say, X barrels of feed. The flow of cracked feed stock $F_c$ is measured by an orifice plate 148 and the magnitude of such flow rate, translated into resistance, is continuously set on the electrical resistance by pointer "b." The flow rate of the straight run feed stock $F_{sr}$ corresponds therefore to the portion of the resistance corresponding to F which remains unmatched by $F_c$. Accordingly, in Figure 2, motor valve 143 is controlled by instrument 210 which is of the type shown in Figure 3 or a pneumatic equivalent and which continuously maintains the electrical or other relationship shown in Figure 3.

Referring now more particularly to Figure 4, it often happens that the straight run and cracked feed stocks are introduced through a single inlet into a reaction zone, such as where the hydrogen injection is employed to control the temperature profile of the reactor. An arrangement for controlling the feed rates for this type of operation is shown in Figure 4. Feed stock "A" is introduced through motor valve 220 and line 221 into surge vessel 222. Feed stock "B" is introduced through motor valve 223 and line 224 into surge vessel 222. Motor valve 223 is controlled by a suitable process variable such as pressure, hydrogen concentration or the like. Surge vessel 222 is fitted with liquid level control 225 which in turn actuates motor valve 220. Surge vessel 222 is discharged through line 226 and pump 227 through orifice plate 228 which operates flow recorder control 229 to maintain by control of pump 227 a constant flow rate through line 230.

By the method of control in Figure 4 a constant flow rate through line 230 of the reactor feed is maintained. The flow rate of feed stock "B" through line 224 is controlled by any suitable process variable. Whatever the feed rate of feed stock "B" with relationship to the required reactor feed, liquid lever control 225 operates motor valve 220 to maintain a given level in surge vessel 222. Thus the sum of the flow rates of feed stock "A" and feed stock "B" is maintained constant while the one may be varied by a suitable process control.

While the ratio of the straight run feed to the cracked feed required to maintain temperature control and hydrogen balance varies with the instantaneous composition of both feed streams, it has been found that for typical cracked distillates and straight run distillates, a balance is usually obtained in the vicinity of 30 volume per cent of straight run and 70 volume per cent of cracked stock. Generally the straight run requirement may vary between about 15 and 50 volume per cent and the cracked requirement will be between about 85 and 50 volume per cent correspondingly. The ratio of straight run feed to cracked feed will normally be between about 0.2 and 1.0.

It is thus apparent that in broad aspect the flow rate of two feeds, the one cracked and the other straight run, may be so controlled by the method of this invention that the flow rate of the one feed may be controlled to give a given hydrogen concentration in the hydrogen recycle gas, to give a given hydrogen production or consumption, to maintain a given pressure in the recycle gas system or the like while the flow rate of the other may be controlled to maintain a constant flow of feed to the reactor or to maintain a constant flow of liquid product from the reactor. This method of feed control may be applied to other types of reactors than the moving bed type such as to either fluid or static reactors.

As has been described in connection with Figure 1, a pressure recorder controller 86 operating from the line 85 which carries the gas separated in gas-liquid separator 74 may be employed to vary the flow rate of the cracked feed stock so as to maintain a given set of pressures throughout the reactor system. It is apparent that pressure recorder controller 86 could be employed to operate motor valve 14 controlling the straight run feed stock with the cracked feed stock being in turn controlled to provide a given total volumetric flow to the reactor.

A broader method of employing pressure control to vary the ratio of the straight run to cracked feed stock is shown in Figure 7.

Referring more particularly to Figure 7, gas from gas-liquid separator (for example, gas-liquid separator 74 in Figure 1) flows upwardly through line 250 and enters the recycle gas system (for example, blower 101 of Figure 1). Pressure recorder controller 251 is attached to line 250 and is in turn employed to regulate motor valve 252 which is employed to control the flow of straight run feed such as is performed by motor valve 14 of Figure 1. Make gas from line 250 flows through orifice plate 253 and motor valve 254 into line 255 whence it flows to a suitable storage means not shown or to a second reactor system not shown for hydrogenating hydrocarbon fractions, or otherwise utilized. The control to motor valve 254 is connected to three-way switch 256 which connects to terminals described hereinafter.

Flow recorder controlled 257 is actuated by orifice plate 253 and may be employed by suitable switching of switch 256 to actuate motor valve 254. This modification of the invention may be employed to maintain a constant flow through orifice plate 253 thereby giving a constant flow rate of hydrogen-rich gas. Under these conditions a constant flow rate of make gas is removed from line 255 and the pressure in line 250 is maintained through the action of pressure recorder controller 251 which opens motor valve 252 to permit a greater flow of straight run feed stock and thereby increase the hydrogen make or, alternatively, to close off on motor valve 252 in order to decrease the hydrogen make as required.

Hydrogen analyzer controller 258 is fitted to line 250 and continuously analyzes the gas stream flow therethrough. Hydrogen analyzer controller 258 may be employed by a suitable switching of switch 256 but employed to control motor valve 254. Under these conditions a suitable concentration of hydrogen may be maintained in line 250. When the hydrogen content of the gas stream in line 250 falls below a predetermined value motor valve 254 opens to bleed lean hydrogen from the system. This bleeding in turn causes a reduction in pressure which in turn actuates pressure recorder controller 251 and causes the opening of motor valve 252 to increase the flow of straight run feed stock so as to increase the hydrogen content of the make gas.

Pressure recorder controller 259 may be attached to some particular part of a second hydrogenation reactor system which employs make gas from the first hydrogenation system as the hydrogen feed gas to the second hydrogenation system. Thus the make gas from the apparatus of Figure 1 may be employed for hydrogenating any desired petroleum fraction. A pressure plug in the second hydrogenation reactor is connected to pressure recorder controller 259 which in turn may be connected through a suitable switching of switch 256 to motor valve 254. As the hydrogen requirement of the second hydrogenation reactor system rises or falls motor valve 254 opens or closes in order to meet such requirements. The changes in pressure in line 250 accordingly actuate pressure recorder controller 251 which in turn opens or closes motor valve 252 in order to increase or decrease the flow of straight run feed in order to increase or decrease the hydrogen make gas.

The apparatus of Figure 7 may be employed in connection with apparatus of the temperature control modification of this invention or with the modification wherein the hydrogen, cracked feed stock and straight run feed stock are introduced in a single reactor inlet.

Perhaps the application of this invention can best be understood by reference to the following specific examples.

*Example I*

A mixture of 30% straight run gasoline and 70% coker pressure distillate, both having a boiling range of about 100° to 400° F. is supplied to a fixed bed type reactor. The reactor is filled with a cobalt molybdate type catalyst containing about 2% by weight of CoO and about 10% by weight of $MoO_3$ supported on a carrier consisting essentially of 5% $SiO_2$–95% $Al_2O_3$ in coprecipitated form. The catalyst was prepared by first impregnating the dried carrier with an aqueous cobalt nitrate solution, calcining at 600° C., impregnating with an ammoniacal ammonium molybdate solution and calcining at 600° C.

About 1500 cu. ft. of 60% hydrogen–40% methane is employed as recycle hydrogen and the reaction is carried out at a pressure of about 400 p. s. i. The liquid hourly space velocity is 1.0. The product obtained thereby has about 0.10% by weight of sulfur and contains about 30% by volume of aromatics. The temperature profile of the reactor is shown as the broken curve labeled "M" in Figures 5 and 6.

*Example II*

The work of Example I is repeated but with the changes that a moving catalyst bed is employed and only one-third of the coker distillate is introduced with the straight run gasoline while an additional one-third is introduced 33% down the reactor bed and the remaining one-third at 66% down the reactor bed. The product obtained thereby has about 0.03% by weight of sulfur and contains about 50% by volume of aromatics.

Figure 5:
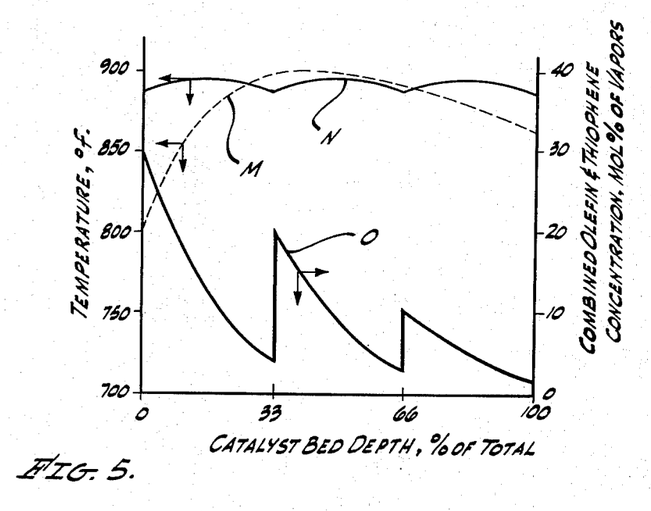
Figure 5 compares the temperature profile of a moving bed reaction zone when cracked feed is injected at three bed levels with the profile obtained where both straight run and cracked feeds are injected at a single level.

The temperature profile of the reactor bed is shown in Figure 5 by curve "N" and the concentration of olefins and thiophenes remaining unreacted (including the amounts added) is shown by curve "O."

*Example III*

The work of Example I is repeated but with the changes that a moving catalyst bed is employed and only 300 cu. ft. of hydrogen per barrel of feed are introduced with the mixture of coker pressure distillate and straight run gasoline and 500 cu. ft. per barrel of feed are introduced 33% down the reactor bed and 600 are introduced 66% down the reactor bed. The product obtained thereby contains about 0.03% by weight of sulfur and about 50% by volume of aromatics.

Figure 6:
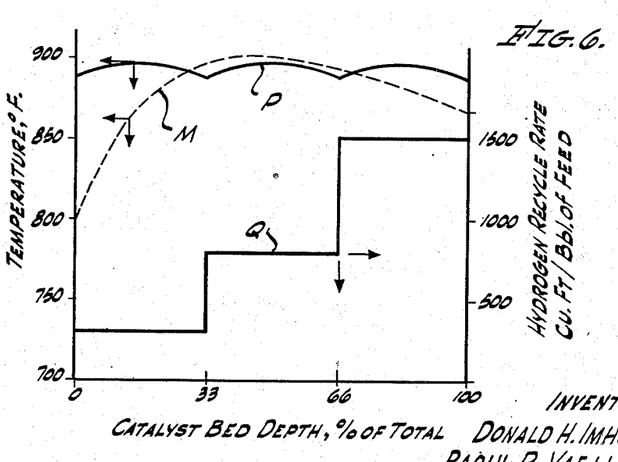
Figure 6 compares the temperature profile of a moving bed reactor when the recycle hydrogen is injected at three bed levels with that obtained where all of the recycle hydrogen is injected with the feed stock.

The temperature profile of the reactor bed is shown in Figure 6 by solid curve "P" while the amount of hydrogen added per barrel is shown by curve "Q."

*Example IV*

When Example II is repeated with the exception that countercurrent flow of catalyst (heated to 1050° F. prior to introduction) is employed and the relative distribution of the coker pressure distillate stream between the three inlets at 0%, 33% and 66% up the reactor bed is automatically controlled to maintain the three parts of the bed at nearly uniform temperature, a further improvement of product quality results as indicated by the increased aromatic content.

It is apparent from the foregoing examples of this invention that close temperature control results in high product quality. Such temperature control may be obtained by control of the composition of the mixed feed supplied to the reactor or preferably by control of the concentration of the olefins or of the recycle hydrogen throughout the reactor bed.

While the advanges of temperature control have been primarily described as those resulting in greater aromatic synthesis, it has also been found that the liquid recovery is also a function of close temperature control. The liquid recovery drops off rapidly as the temperature increases due to the splitting of the hydrocarbons and hydrogenation of the fragments. As the temperature increases above about 925° F. and especially above about 950° F., the hydrocracking increases the production of gas, such as methane, and decreases the liquid recovery. At temperatures in the range of 800° F. to about 900° F. hydrocracking tends to increase the liquid recovery by the production of two hydrocarbon molecules from one hydrocarbon molecule with the lighter products being less dense. Thus temperature control affords a means for controlling the liquid recovery and maintaining it at a maximum for a given product conversion.

Throughout this specification the term "hydrogenatable hydrocarbon feed stock" is used to denote a mixture of hydrogenatable compounds and hydrocarbons and "dehydrogenatable hydrocarbon feed stock" denotes a mixture of dehydrogenatable compounds and hydrocarbons. Thus a mixture of sulfur compounds and hydrocarbons would be a "hydrogenatable hydrocarbon feed stock." Furthermore, a reaction zone may correspond to a single reaction zone, i. e., a primary reaction zone, or it may be a series of such reaction zones.

The foregoing disclosure of our invention is not to be considered as limiting since many variations may be made by those skilled in the art without departing from the spirit or scope of the following claims.

We claim:

1. A process for the conversion of hydrocarbons which comprises passing a hydrogenatable hydrocarbon feed stock, a dehydrogenatable hydrocarbon feed stock and hydrogen into a reaction zone, said reaction zone containing a continuously replenished bed of a carrier-supported cobalt-molybdate catalyst, maintaining conditions in said reaction zone which cause said hydrogenatable hydrocarbon feed stock to be hydrogenated and said dehydrogenatable hydrocarbon feed stock to be dehydrogenated, continuously controlling the relative concentrations of hydrogen, hydrogenatable hydrocarbon feed stock and dehydrogenatable hydrocarbon feed stock in said reaction zone by injecting at least part of at least one of said reactants at a plurality of points along said reaction zone, so as to decrease temperature changes through the reaction zone and withdrawing products from said reaction zone.

2. A process according to claim 1 wherein the volumetric ratio of dehydrogenatable hydrocarbon feed stock to hydrogenatable hydrocarbon feed stock is controlled between about 0.2 and 1.0 and the temperature changes throughout said reaction zone do not exceed 20° F.

3. A process for the catalytic conversion of hydrocarbon distillates which comprises introducing one reactant selected from the class consisting of hydrogen and a cracked distillate into a reaction zone through a plurality of inlets, the amounts of said one reactant injected at each inlet being controlled by a process variable in such manner as to minimize temperature fluctuations through said reaction zone, said inlets being located at a plurality of points along the vapor flow through said reaction zone, introducing a straight run distillate and the other of said reactants through an inlet which is upstreamward with respect to said vapor flow through said reaction zone, continuously passing a solid carrier-supported cobalt-molybdate catalyst into and through said reaction zone, withdrawing products from said reaction zone, withdrawing spent catalyst from said reaction zone, regenerating said spent catalyst, and continuously returning the regenerated catalyst to said reaction zone.

4. A process according to claim 3 wherein the reactant injected into said plurality of inlets is hydrogen.

5. A process according to claim 3 wherein the reactant injected into said plurality of inlets is said cracked distillate.

6. A process according to claim 3 wherein the volumetric ratio of straight run distillate to cracked distillate is controlled to between about 0.2 and 1.0.

7. A process for conjointly reforming a naphthenic straight-run hydrocarbon stock and a cracked hydrocarbon stock each boiling below about 450° F., which process comprises flowing an active reforming-dehydrogenation catalyst comprising as an essential active ingredient an oxide of a metal selected from the group consisting of vanadium, chromium, molybdenum and tungsten in the form of a granular substantially compact bed through a plurality of alternating gas engaging zones and reaction zones, said gas engaging zones being substantially devoid of catalyst, passing said straight-run stock into a first engaging zone, passing at least a part of said cracked stock and at least a part of recycle hydrogen steam into said first engaging zone, flowing said straight-run stock, said cracked stock and said recycle hydrogen stream from said first engaging zone into a first reaction zone and effecting therein endothermic conversion and aromatization of said straight-run stock and exothermic conversion and hydrogenation of said cracked stock, regulating the relative concentrations of cracked stock and hydrogen in said first engaging zone by a means responsive to the temperature of said first reaction zone, passing products from said first reaction zone through a subsequent engaging zone into a subsequent reaction zone, regulating the relative concentrations of cracked stock and hydrogen in said subsequent engaging zone by adding further quantities of one of the reactants selected from the group consisting of cracked stock and hydrogen, said addition of reactant in said subsequent engaging zone being controlled by a means responsive to the temperature of said subsequent reaction zone, passing the products from the last of said reaction zones to a product disengaging zone and separating products from catalyst therein, separating a recycle hydrogen stream from said products and returning at least a part of said recycle hydrogen stream to said first engaging zone, the total volumetric ratio of straight-run to cracked stock in said process being controlled between about 0.2 and 1.0, the temperatures throughout said plurality of reaction zones being controlled within the range of about 850° and 900° F., the variation from the lowest to the highest of said temperatures not exceeding about 20° F. and the pressure in said reaction zones being between about 200 p. s. i. and 600 p. s. i.

8. A process according to claim 7 wherein the said catalyst is of the cobalt molybdate type.

9. A process according to claim 7 wherein the spent catalyst separated from the series of reaction zones flows by gravity through a stripping zone, a pressuring zone, and into an induction zone and is lifted in a lifting zone to a separation zone wherein it is separated from the lift gas and flows by gravity through a regeneration zone, a sealing zone, and a reduction zone into said series of reaction zones.

10. A process according to claim 7 wherein the spent catalyst separated from the series of reaction zones flows through a stripping zone, a sealing zone, a regeneration zone and through a pressuring zone into an induction zone, whence it is lifted with a hydrogen containing lift gas through a lifting zone and is simultaneously reduced and is then passed into a separation zone to separate the lift gas and flows to said series of reaction zones.

11. A process according to claim 7 wherein the flow rate of the one of the two stocks into said first engaging zone is controlled by a means responsive to the variations of a process variable and the flow rate of the other of said two stocks into said first engaging zone is controlled by a means responsive to the flow rate of said products after said separating of said recycle hydrogen stream.

12. A process according to claim 7 wherein the flow rate of the one of the two stocks into said first engaging zone is controlled by a means responsive to the variations of a process variable and the flow rate of the other of said two stocks into said first engaging zone is controlled by a means responsive to the flow rate of the first of said two stocks.

13. A process according to claim 11 wherein said process variable is the pressure of said recycle hydrogen stream and at least a part of said hydrogen recycle stream is removed from the system.

References Cited in the file of this patent

UNITED STATES PATENTS

| Number | Name | Date |
| --- | --- | --- |
| 2,226,097 | Happel et al. | Dec. 24, 1940 |
| 2,335,717 | Welty, Jr., et al. | Nov. 30, 1943 |
| 2,349,045 | Layng et al. | May 16, 1944 |
| 2,390,031 | Schutte et al. | Nov. 27, 1945 |
| 2,409,353 | Giuliani et al. | Oct. 15, 1946 |
| 2,416,894 | Barron | Mar. 4, 1947 |
| 2,528,693 | Jonson | Nov. 7, 1950 |